United States Patent [19]
Hollencamp

[11] 3,815,397
[45] June 11, 1974

[54] SWAGING AND FINISHING TOOL

[75] Inventor: Eugene A. Hollencamp, Dayton, Ohio

[73] Assignee: Carrier Corporation, Syracuse, N.Y.

[22] Filed: Apr. 2, 1973

[21] Appl. No.: 347,087

[52] U.S. Cl. .................................. 72/121, 72/126
[51] Int. Cl. .......................................... B21d 41/04
[58] Field of Search ....... 72/118, 121, 126; 29/90 R

[56] References Cited
UNITED STATES PATENTS

| | | | |
|---|---|---|---|
| 1,665,915 | 4/1928 | Ekman | 72/126 |
| 1,798,074 | 3/1931 | Duncan | 72/121 |
| 2,522,257 | 9/1950 | Curtis | 72/126 |
| 3,350,762 | 11/1967 | Koppelmann | 29/90 |
| 3,452,567 | 7/1969 | Marcovitch | 72/121 |
| 3,504,514 | 4/1970 | Korson | 72/126 |

*Primary Examiner*—Lowell A. Larson
*Attorney, Agent, or Firm*—J. Raymond Curtin

[57] ABSTRACT

The tool of this invention functions to effect a substantial reduction in the end portion of the workpiece. A circular series of rollers, mounted in a roller cage, are contained within a mandrel sleeve fixedly secured to a driver. The forward end portions of the rollers are formed with conical surfaces converging toward the outer ends of the rollers. A roller supporting plug is rotatably attached to the driver and is positioned within the inner portions of the rollers for engagement thereby to maintain the rollers against the inner surface of the mandrel. The rollers and the inner surface of the mandrel are dimensioned so that the portions of the rollers intermediate the forward and inner ends thereof inscribe a diameter inside the intermediate portions of the rollers of proper size to form the diameter of the reduced end portion of the workpiece and finish the same.

5 Claims, 1 Drawing Figure

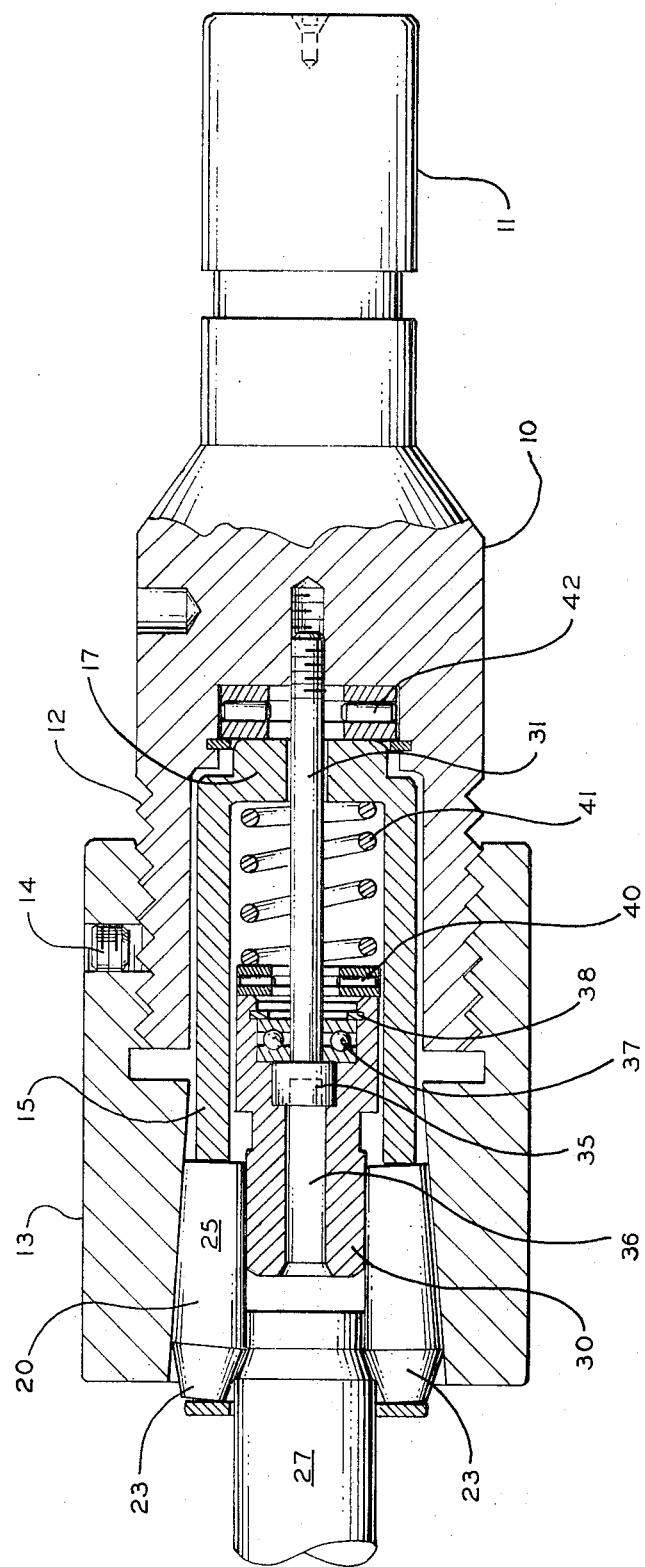

SWAGING AND FINISHING TOOL

BACKGROUND OF THE INVENTION

The external surfaces of cylindrical metallic workpieces have been processed by forcibly engaging the surface of the workpiece with a circular assembly of rollers during relative rotation between the workpiece and the assembly of rollers. Such tools are known as burnishing tools. They impart a hardened, smooth surface to the workpiece. By such tools, the diameter of the workpiece is reduced between 0.001 and 0.004 of an inch.

This invention has as an object a swaging tool operable to effect a substantial reduction on the order of .04 to .06 of an inch in the diameter of the end portion of a cylindrical workpiece.

SUMMARY OF THE INVENTION

The structural arrangement as shown in the drawing consists of a driver, to the front or forward end of which a mandrel sleeve is fixedly secured. A roller cage is mounted within the mandrel and a series of swaging rollers are rotatably mounted in the sleeve. The outer ends of the rollers are of conical formation. The mandrel sleeve is formed with a converging tapered bore and the body portions of the swaging rollers are tapered at the same angle as the bore in the mandrel, whereby the inner sides of the rollers inscribe a cylindrical surface having a diameter the same as the finished diameter of the reduced end portion of the workpiece. To prevent inward movement or canting of the swaging rollers from the inner surface of the mandrel sleeve, there is provided a plug member disposed within the inner end portions of the rollers. This plug member is rotatably supported on a stem member connected to the driver. The plug is restrained from axial movement relative to the driver.

BRIEF DESCRIPTION OF THE DRAWING

The drawing is a lengthwise sectional view with a part in elevation of a tool embodying my invention.

DESCRIPTION OF THE PREFERRED EMBODIMENT

Referring to the drawing, the swaging tool includes a driving member 10 having a shank 11 for attachment to a supporting or rotating driving member. The main portion of the driver 10 is of cylindrical formation and is provided with external threads 12 for attachment of a mandrel sleeve 13 to the driver. The threaded connection 12 provides for axial adjustment of the mandrel 13 relative to the driver 10 and the mandrel is fixed in adjusted position by a set screw 14. The inner end of the cage 15 is formed with an inner end closure wall 17. The outer portion of the cage is formed with slots to receive a circular series of swaging rollers 20.

The outer end portions 23 of the rollers 20 are formed with conical surfaces converging toward the outer ends of the rollers. The main body portions 25 of the rollers are formed on a taper converging inwardly. The inner surface of the mandrel 13 is formed with a tapered bore converging inwardly at the same angle at which the swaging rollers are formed. With this arrangement, the inner sides of the rollers inscribe a cylindrical area having a diameter comparable to the reduced diameter of the workpiece. On relative axial movement between the workpiece 27 and the tool, the forward end of the workpiece confronting the tool is engaged by the conical end surfaces 23 of the rollers and is swaged inwardly. The swaged end portion of the workpiece is finished in true cylindrical form by the portions of the rolls 25 intermediate the conical surfaces 23 and the inner end portions of the rollers.

During the swaging operation, extreme radial outward pressure is exerted on the forward ends of the rolls. In order to prevent the inner portions of the rollers from moving inwardly or being canted from the bore of the mandrel 13, a roller supporting plug 30 is positioned within the inner portions of the rollers 20. The support plug 30 is rotatably mounted upon a stem 31 extending coaxially and forwardly from the driver 10. Stem 31 is shown in the form of a capscrew, the inner end of which is threaded into the driver 10, and the outer end is formed with a head portion 35. The plug 30 is formed with an axially extending bore 36 terminating in a counterbore having a running fit with the head portion 35 of the screw 31. The inner end of the plug 30 is formed with a larger counterbore in which a thrust bearing 37 is mounted. The bearing is positioned on the screw 31 and is engaged by the head of the screw and the bottom wall of the counterbore. The bearing is retained in the counterbore by a retaining ring 38. Accordingly, the plug is restrained against axial movement relative to the driver. A thrust bearing 40 encircles the shank of the screw 31 and is interposed between the inner end of the plug 30 and a helical compression spring 41. The opposite end of the spring 41 acts against the inner wall 17 of the cage, yieldingly urging the cage against a thrust bearing 42 mounted in a recess formed in the driver 10.

With the roller cage pressed against the bearing 42, the mandrel 13 is adjusted so that the rollers 20 are positioned to bring about the desired diameter of the outer swaged end of the workpiece 27. Preferably, the roller receiving slots formed in the cage 15 are skewed at an angle to the axis of the tool. This angle of the rollers is such in respect to the direction of rotation of the tool that the rollers effect a feeding movement to advance the tool over the end of the workpiece.

With this arrangement, the workpiece is located coaxially with the tool and is restrained against axial movement. The shank 11 of the driver 10 is attached to a spindle mounted for rotary and axial movement. To effect the processing of the workpiece, the tool is advanced forwardly to bring the conical end portions 23 of the rollers into engagement with the workpiece and the tool is advanced to effect a sufficient axial length of the reduced end portion of the workpiece. The driver, mandrel and plug 30 are then moved in a direction away from the workpiece. During the initial part of such movement, the rollers may cling to the workpiece due to the self-feeding action of the rollers and the high pressure on the outer conical ends of the rollers. Such initial relative movement between the mandrel and cage will compress the spring 41 until the force of the spring will separate the rollers from the workpiece. That is, the spring 41 permits the readily rearward movement of the mandrel, and the spring then effects separation of the rollers from the workpiece. The spring 41 also performs the function of correctly positioning the cage and rollers relative to the mandrel prior to the engagement of the rollers with the workpiece.

It will be apparent that during the swaging operation, excessive outward radial pressure is applied against the outer ends of the rolls 20. However, the rolls do not become canted or the inner ends of the rolls moved away from the mandrel 13 due to the roll supporting plug 30. The axial length of the engagement between the plug 30 and the rollers 20 is greater than the axial movement of the cage 15 relative to the mandrel.

The head 35 of the capscrew is formed with a tool receiving socket. A tool, such as an Allen hex wrench, is passed through the bore 36 in plug 30 for engagement with the socket. This arrangement provides for the convenient assembly of the plug and cage units to the driver 10.

While I have described the preferred embodiments of my invention, it is to be understood that the invention is not limited thereto, but may be otherwise embodied within the scope of the following claims.

I claim:

1. A swaging and finishing tool for swaging and finishing the inner end portion of a cylindrical workpiece to a smaller diameter comprising a rotatable and axially movable driver, a mandrel sleeve fixed to said driver, a tubular roller cage mounted within said mandrel, a circular series of rollers rotatably mounted in said cage and restrained against axial movement relative thereto, the outer portions of said rollers being formed with conical surfaces converging toward the outer ends of the rollers, a cylindrical roller supporting plug rotatably attached to the driver and positioned within the inner portions of the rollers in said series, said plug serving to prevent inward radial movement of said rollers from said mandrel sleeve.

2. A swaging and finishing tool as set forth in claim 1 wherein said roller cage is mounted for limited axial movement relative to said mandrel and means yieldingly opposing such movement of said cage.

3. A swaging and finishing tool as set forth in claim 1 wherein said roller supporting plug is fixed against axial movement relative to said driver.

4. A swaging and finishing tool as set forth in claim 1 wherein said mandrel is adjustable axially on said driver and means fixing said mandrel to said driver in adjusted position.

5. A swaging and finishing tool as set forth in claim 1 wherein the inner end of said tubular roller cage is formed with an inner end wall, said roller supporting plug being positioned forwardly of said end wall and fixed against axial movement relative to said driver, and a helical compression spring interposed between the inner end of said plug and said end wall of said cage.

* * * * *